(12) United States Patent
Mimoun

(10) Patent No.: US 11,435,052 B2
(45) Date of Patent: Sep. 6, 2022

(54) METHOD FOR CORRECTING A LIGHT PATTERN AND AUTOMOTIVE LIGHTING DEVICE

(71) Applicant: VALEO VISION, Bobigny (FR)

(72) Inventor: Mickael Mimoun, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/415,086

(22) PCT Filed: Dec. 5, 2019

(86) PCT No.: PCT/EP2019/083876
§ 371 (c)(1),
(2) Date: Jun. 17, 2021

(87) PCT Pub. No.: WO2020/126527
PCT Pub. Date: Jun. 25, 2020

(65) Prior Publication Data
US 2022/0065421 A1    Mar. 3, 2022

(30) Foreign Application Priority Data

Dec. 19, 2018 (EP) .................................. 18214262

(51) Int. Cl.
*F21S 41/153* (2018.01)
*F21S 41/675* (2018.01)
(Continued)

(52) U.S. Cl.
CPC .......... *F21S 41/675* (2018.01); *F21S 41/153* (2018.01); *G02B 26/0833* (2013.01);
(Continued)

(58) Field of Classification Search
CPC .............. F21S 41/153; F21W 2102/16; F21Y 2105/10; B60Q 2300/054; B60Q 2300/056
See application file for complete search history.

(56) References Cited

U.S. PATENT DOCUMENTS

| 10,054,279 B2 * | 8/2018 | Kliebisch .............. F21S 41/285 |
| 2015/0022083 A1 | 1/2015 | Huester et al. |

(Continued)

FOREIGN PATENT DOCUMENTS

| DE | 10 2008 062 640 A1 | 7/2009 |
| DE | 10 2008 062 639 A1 | 6/2010 |

(Continued)

OTHER PUBLICATIONS

International Search Report dated Mar. 23, 2020 in PCT/EP2019/083876 filed Dec. 5, 2019.

*Primary Examiner* — Robert J May
(74) *Attorney, Agent, or Firm* — Oblon, McClelland, Maier & Neustadt, L.L.P.

(57) ABSTRACT

A method for correcting a light pattern provided by an automotive lighting device, wherein the light pattern is provided at least by a matrix arrangement of light sources. The method includes a first step of projecting a high beam pattern with a first zone where luminous intensity is lower, the first zone having a rectangular edge with four sides. The second step includes providing a number of pixels for each of the four sides of the edge of the first zone, thus creating an upper blur zone, a lower blur zone, a left blur zone and a right blur zone. A final step includes creating a blur pattern for the upper blur zone which extends along columns, a blur pattern for the lower blur zone which extends along columns, a blur pattern for the left blur zone which extends along rows and a blur pattern for the right blur zone which extend along rows, where the luminous intensity in each row (Continued)

or column adapts from the luminous intensity of the first zone to the luminous intensity of the high beam pattern. An automotive lighting device configured to perform these steps is also provided.

20 Claims, 2 Drawing Sheets

(51) Int. Cl.
  *G02B 26/08* (2006.01)
  *F21W 102/16* (2018.01)
  *B60Q 1/14* (2006.01)
(52) U.S. Cl.
  CPC ........ *B60Q 1/143* (2013.01); *B60Q 2300/054* (2013.01); *B60Q 2300/056* (2013.01); *F21W 2102/16* (2018.01)

(56) References Cited

U.S. PATENT DOCUMENTS

| | | |
|---|---|---|
| 2016/0033102 A1 | 2/2016 | Hiratsuka et al. |
| 2017/0334337 A1 | 11/2017 | Ohno |
| 2018/0310375 A1 | 10/2018 | Moisel |

FOREIGN PATENT DOCUMENTS

| | | |
|---|---|---|
| DE | 10 2013 016 904 A1 | 7/2014 |
| DE | 10 2017 202 980 A1 | 8/2018 |

\* cited by examiner

METHOD FOR CORRECTING A LIGHT PATTERN AND AUTOMOTIVE LIGHTING DEVICE

TECHNICAL FIELD

This invention is related to the field of automotive lighting devices, and more particularly, to the way light patterns are corrected when using a glare free functionality.

STATE OF THE ART

Glare free functionalities are a way of providing a high beam pattern when one or more vehicles are detected in front of the headlamp. This functionality includes the use of a blank "tunnel section", where less intense light beams are projected, so that the driver has a high visibility experience but without bothering other drivers.

However, this tunnel section has two drawbacks.

First one is related to the high contrast between the high value of luminous intensity associated to the high beam functionality and the much lower intensity of the tunnel section. This sharp discontinuity may cause visual discomfort.

Further, there is a second drawback related to the dynamic behaviour of this tunnel section. When the object affected by the tunnel section has a relative movement with respect to the headlamp, the light sources must adapt to this movement, and this sometimes causes that light pixels to behave in a jerky manner.

These problems have not been addressed so far, so a solution is sought.

SUMMARY OF THE INVENTION

The invention provides an alternative solution for providing a glare free functionality by a method for correcting a light pattern according to claim 1 and an automotive lighting device according to claim 10. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for correcting a light pattern provided by an automotive lighting device, wherein the light pattern is provided at least by a matrix arrangement of light sources, the method comprising the steps of projecting a high beam pattern with a first zone where luminous intensity is lower than half of the high beam luminous intensity, the first zone having a rectangular edge with four sides;

providing a number of pixels for each of the four sides of the edge of the first zone, thus creating an upper blur zone, a lower blur zone, a left blur zone and a right blur zone;

create a blur pattern for the upper blur zone which extends along columns, a blur pattern for the lower blur zone which extends along columns, a blur pattern for the left blur zone which extends along rows and a blur pattern for the right blur zone which extend along rows, where the luminous intensity in each row or column adapts from the luminous intensity of the first zone to the luminous intensity of the high beam pattern.

The blur pattern aims to solve two problems. First one is the visual discomfort caused by the sharp contrast between the high beam pattern and the luminous intensity in the first zone, which is aimed to protect another vehicle from the high luminous intensity of the high beam pattern. Second one is the visual discomfort caused by the movement of this first zone to follow the movement of the vehicle to be protected. The blurred zone reduces the total intensity change so that this movement is perceived as smoother.

In some particular embodiments, the gradient of luminous intensity along the same row or column of the blur pattern is lower than 0.4, wherein the gradient G is measured between two adjacent pixels P1 and P2 of the same row or column according to the formula $$G = \log(I1) - \log(I2),$$

where I1 is the luminous intensity in pixel P1 and I2 is the luminous intensity in pixel P2, measured in cd.

The gradient is limited for sharpness reasons, so that the blurred zone is perceived as continuous by the driver.

In some particular embodiments, each blur pattern is linear, so that the luminous intensity I3 of a pixel P3 which is after a pixel P1 and P2 is $$I3 = I2 + (I2 - I1)$$

wherein I1 is the luminous intensity of P1 and I2 is the luminous intensity of P2.

A linear shape of the blur pattern provides an easy calculation of each blur value and a good visual comfort.

In other particular embodiments, each blur pattern has a gradient equal to 0 in the first and last pixel of the blur pattern and has a maximum gradient of 0.4.

The first and last pixels are the pixels directly in contact with the first zone and with the high beam pattern, so they ensure a smooth transition into these zones. The rest of the blur pattern adapts to these smooth transition zones varying the gradient until a maximum value of 0.4, which is allowed by standard regulations.

In some particular embodiments, the number of pixels for each blur zone depends on the difference between the luminous intensity of the high beam pattern and the luminous intensity on the first zone.

A first criterion to define the number of pixels, and hence the size of the blurred zone, is related to homogeneity, and takes into account the difference between the luminous intensity of the high beam pattern and the luminous intensity in the first zone. The highest this difference, the greatest number of pixels that will be necessary to provide the blurred zone with a gradient which is not higher than 0.4.

In some particular embodiments, the first zone is intended to be displaced at a first speed, and the number of pixels for each blur zone depends on the first speed.

A second criterion to define the number of pixels, and hence the size of the blurred zone, is related to the smoothness when this first zone is moved, due to the movement of the object which must be kept inside the first zone.

In some particular embodiments, the number of pixels for each blur zone has a linear relation with respect to the first speed, according to the formula $N = a \cdot S$, wherein N is the number of pixels, a is a constant comprised between 0.02 and 0.025 and S is the first speed measured in degrees per second.

This first formula suits particularly well when the blur pattern is linear.

In some particular embodiments, the number of pixels for each blur zone has a linear relation with respect to the first speed, according to the formula N=a·S, wherein N is the number of pixels, a is a constant comprised between 0.06 and 0.07 and S is the first speed measured in degrees per second.

This second formula suits particularly well when the blur pattern depends on the gradient.

In some particular embodiments, the number of pixels for each blur zone is chosen as the maximum number between a first criterion depending on the difference between the luminous intensity of the high beam pattern and the luminous intensity on the first zone and a second criterion depending on the first speed.

Choosing a blur zone which is the greatest of the two criteria ensures that both criteria are met. As a consequence, such a blurred zone solves the two problems of homogeneity and smoothness.

In a second inventive aspect, the invention provides an automotive lighting device comprising
- a matrix arrangement of solid-state light sources, intended to provide a high beam pattern with a first zone where the luminous intensity is less than half the luminous intensity of the high beam pattern;
- control means for accomplishing the steps of the method according to the first inventive aspect.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

This lighting device provides a glare free high beam pattern with an improved light pattern of the first zone, intended to avoid glare to a vehicle which runs in front of the lighting device of the invention.

In some particular embodiments, the matrix arrangement comprises at least 2000 solid-state light sources.

This invention can be useful for many types of lighting matrix/array-based technology, from the simplest one, with only a few thousands light sources, to more advanced one, with several hundred thousand one.

BRIEF LIST OF DRAWINGS AND REFERENCE NUMBERS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

Figure 1:
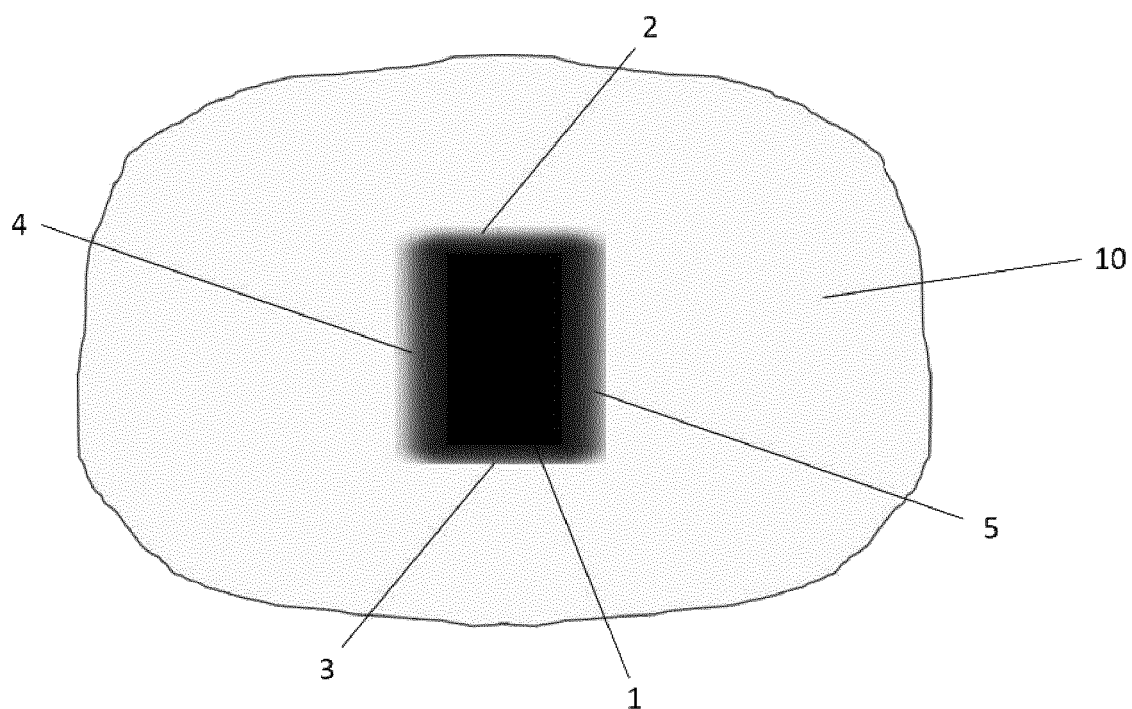
FIG. 1 shows a light pattern of a high beam functionality projected by an automotive lighting device according to the invention.

Elements of the example embodiments are consistently denoted by the same reference numerals throughout the drawings and detailed description where appropriate:
1 First zone
2 Upper blur zone
3 Lower blur zone
4 Left blur zone
5 Right blur zone
10 High beam pattern

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a light pattern of a high beam functionality projected by an automotive lighting device according to the invention. This automotive lighting device comprises control means to correct the shape of the beam pattern in order to solve the aforementioned problems.

This high beam pattern 10 comprises a first zone 1 intended to protect an object, e.g. a car, from the high luminous intensity characterizing the high beam pattern. The first zone 1 has a luminous intensity which is one tenth of the luminous intensity of the high beam pattern 10. This first zone 1 comprises four blur zones: an upper blur zone 2, a lower blur zone 3, a left blur zone 4 and a right blur zone 5. Each blur zone is intended to provide a soft transition between the high luminous intensity of the high beam pattern 10 and the low luminous intensity of the first zone 1. As a consequence, the upper 2 and lower 3 blur zones will provide this blur in columns, in a vertical way, and the left 4 and right 5 blur zones will provide this blur in rows, in a horizontal way.

The lighting device has a matrix arrangement of light sources, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixilated light beam by the matrix arrangement. The control centre is thus able to individually control the light emission of each pixel of the matrix arrangement.

Alternatively to what has been presented above, the matrix arrangement 6 may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control centre.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

The blur zones are defined by two main features: the size, which is the number of pixels that are dedicated to the blur zone, and the luminous profile or shape, which is the way the luminous intensity is adapted from the high value to the low value. These features are interrelated, and the choice of both of them are affected by two criteria.

The first criterion is the homogeneity criterion. A typical high beam pattern may have an intensity of 40.000 cd, and the first zone usually has an intensity of 500 cd. As a consequence, this leap in luminous intensity may not be achieved in one or two pixels. A magnitude call gradient is used to measure the variation in the luminous intensity between two adjacent pixels P1 and P2, and is usually defined as $G=\log(I1)-\log(I2)$, where I1 is the luminous intensity in pixel P1 and I2 is the luminous intensity in pixel P2, measured in cd.

Figure 2A:
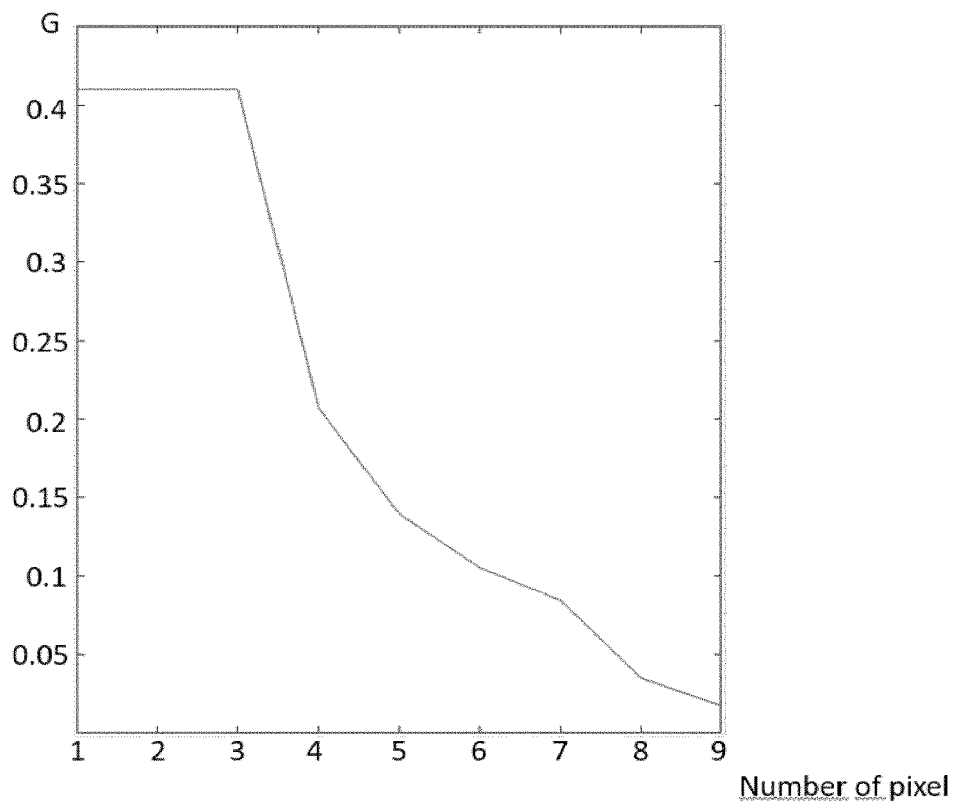
FIGS. 2a and 2b show two graphics related to the shape of the blur zone in an automotive lighting device according to the invention.
Figure 2B:
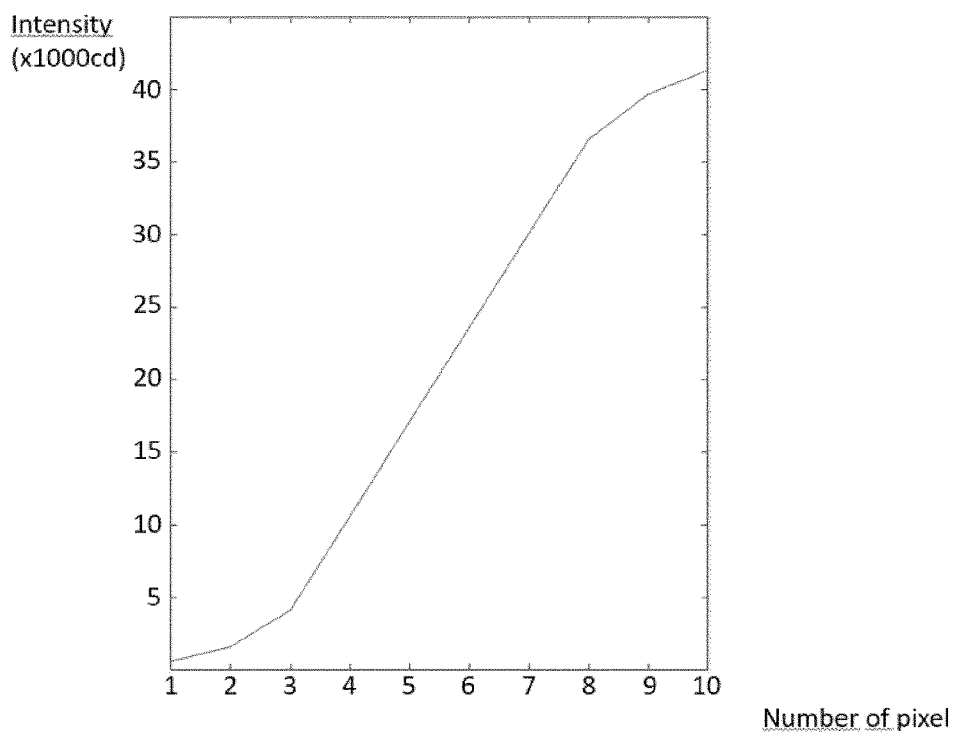

This gradient may not be higher than 0.4, according to standard regulations. Using the formula above, it provides a minimum of 9 pixels to provide an acceptable blur zone from 40.000 cd to 500 cd. FIGS. 2a and 2b show two graphics related to this shape. FIG. 2a shows the variation of the luminous intensity from the 500 cd of the first zone to the more than 40.000 cd of the high beam pattern. FIG. 2b shows the value of gradient for this evolution; in the first two pixels, the gradient value is maximum, since it is necessary to "grow" as fast as possible. In the next pixels, the gradient is just enough to guarantee a smooth transition between the pixels which are near to the high beam zone and the high beam pattern.

The second criterion is related to the smoothness of the movement of this first zone where the object to be protected moves. This movement is defined in terms of degrees per second, since the pixels represent one fraction of degree, depending on the resolution of the matrix arrangement of light sources.

According to this second criterion, the number of pixels needed in each blur zone depends on the speed of the first zone. The smoothness is measured as the number of variations in the visible surface, or discontinuities, caused in the light pattern. The highest the blurred zone is, the minimum discontinuities will have, but the high beam experience is compromised. As a consequence, a minimum in the number of discontinuities is sought for each blur profile.

Using numeric analysis, when a linear profile is used, the number of discontinuities is minimum and equals to twice the resolution when the number of pixels of each blur zone is given by the expression $N=a \cdot S$, wherein N is the number of pixels, a is a constant comprised between 0.02 and 0.025 for a resolution of 0.07 degrees per pixel, and S is the first speed measured in degrees per second. On the contrary, when a gradient depending profile is used, such as the one shown in FIG. 2a, the number of discontinuities is minimum and equals to twice the resolution when the number of pixels is given by the same expression, but the value of a being set between 0.06 and 0.07, for the same resolution.

A gradient depending profile provides a good solution for both criteria, and the final blur size is chosen as the maximum between the size provided by the first criterion and the size provided by the second criterion.

The invention claimed is:

1. Method for correcting a light pattern provided by an automotive lighting device, wherein the light pattern is provided at least by a matrix arrangement of light sources, the method comprising the steps of projecting a high beam pattern with a first zone where luminous intensity is lower than half of the high beam luminous intensity, the first zone having a rectangular edge with four sides;

providing a number of pixels for each of the four sides of the edge of the first zone, thus creating an upper blur zone, a lower blur zone, a left blur zone and a right blur zone;

create a blur pattern for the upper blur zone which extends along columns, a blur pattern for the lower blur zone which extends along columns, a blur pattern for the left blur zone which extends along rows and a blur pattern for the right blur zone which extend along rows, where the luminous intensity in each row or column adapts from the luminous intensity of the first zone to the luminous intensity of the high beam pattern.

2. Method according to claim 1, wherein the gradient of luminous intensity along the same row or column of the blur pattern is lower than 0.4, wherein the gradient G is measured between two adjacent pixels P1 and P2 of the same row or column according to the formula G=log(I1)−log (I2), where I1 is the luminous intensity in pixel P1 and I2 is the luminous intensity in pixel P2, measured in cd.

3. Method according to claim 2, wherein each blur pattern is linear, so that the luminous intensity I3 of a pixel P3 which is after a pixel P1 and P2 is $$I3=I2+(I2-I1)$$

wherein I1 is the luminous intensity of P1 and I2 is the luminous intensity of P2.

4. Method according to claim 2, wherein each blur pattern has a gradient equal to 0 in the first and last pixel of the blur pattern and has a maximum gradient of 0.4.

5. Method according to claim 2, wherein the number of pixels for each blur zone depends on the difference between the luminous intensity of the high beam pattern and the luminous intensity on the first zone.

6. Method according to claim 2, wherein the first zone is intended to be displaced at a first speed, and the number of pixels for each blur zone depends on the first speed.

7. Method according to claim 1, wherein each blur pattern is linear, so that the luminous intensity I3 of a pixel P3 which is after a pixel P1 and P2 is $$I3=I2+(I2-I1)$$

wherein I1 is the luminous intensity of P1 and I2 is the luminous intensity of P2.

8. Method according to claim 3, wherein each blur pattern has a gradient equal to 0 in the first and last pixel of the blur pattern and has a maximum gradient of 0.4.

9. Method according to claim 3, wherein the number of pixels for each blur zone depends on the difference between the luminous intensity of the high beam pattern and the luminous intensity on the first zone.

10. Method according to claim 1, wherein each blur pattern has a gradient equal to 0 in the first and last pixel of the blur pattern and has a maximum gradient of 0.4.

11. Method according to claim 3, wherein the first zone is intended to be displaced at a first speed, and the number of pixels for each blur zone depends on the first speed.

12. Method according to claim 4, wherein the number of pixels for each blur zone depends on the difference between the luminous intensity of the high beam pattern and the luminous intensity on the first zone.

13. Method according to claim 4, wherein the first zone is intended to be displaced at a first speed, and the number of pixels for each blur zone depends on the first speed.

14. Method according to claim 1, wherein the number of pixels for each blur zone depends on the difference between the luminous intensity of the high beam pattern and the luminous intensity on the first zone.

15. Method according to claim 14, wherein the first zone is intended to be displaced at a first speed, and the number of pixels for each blur zone depends on the first speed.
wherein the number of pixels for each blur zone is chosen as the maximum number between a first criterion depending on the difference between the luminous intensity of the high beam pattern and the luminous intensity on the first zone and a second criterion depending on the first speed.

16. Method according to claim 1, wherein the first zone is intended to be displaced at a first speed, and the number of pixels for each blur zone depends on the first speed.

17. Method according to claim 16, wherein the number of pixels for each blur zone has a linear relation with respect to the first speed, according to the formula N=a·S, wherein N is the number of pixels, a is a constant comprised between 0.02 and 0.025 and S is the first speed measured in degrees per second.

18. Method according to claim 16, wherein the number of pixels for each blur zone has a linear relation with respect to the first speed, according to the formula N=a·S, wherein N is the number of pixels, a is a constant comprised between 0.06 and 0.07 and S is the first speed measured in degrees per second.

19. Automotive lighting device comprising
a matrix arrangement of solid-state light sources, intended to provide a high beam pattern with a first zone where the luminous intensity is less than half the luminous intensity of the high beam pattern;
control means for accomplishing the steps of the method according to claim 1.

20. Automotive lighting device according to claim 19, wherein the matrix arrangement comprises at least 2000 solid-state light sources.

* * * * *